United States Patent [19]
Yamamoto et al.

[11] Patent Number: 5,774,819
[45] Date of Patent: Jun. 30, 1998

[54] VEHICLE STEERING CONTROL SYSTEM

[75] Inventors: Yorihisa Yamamoto; Yutaka Nishi; Takashi Nishimori; Hiroyuki Tokunaga; Hideki Machino, all of Saitama-ken, Japan

[73] Assignee: Honda Giken Kogyo Kabushiki Kaisha, Tokyo, Japan

[21] Appl. No.: 485,484

[22] Filed: Jun. 7, 1995

[30] Foreign Application Priority Data

Jul. 27, 1994 [JP] Japan ..................................... 6-196065

[51] Int. Cl.⁶ ....................................................... B62D 5/04
[52] U.S. Cl. .................................. 701/41; 80/79.1; 80/140
[58] Field of Search ...................... 364/424.05; 180/79.1, 180/140, 233, 197; 701/41, 42

[56] References Cited

U.S. PATENT DOCUMENTS

| | | | |
|---|---|---|---|
| 4,830,127 | 5/1989 | Ito et al. ................................. | 180/79.1 |
| 4,858,134 | 8/1989 | Eto et al. ............................ | 364/424.05 |
| 4,875,540 | 10/1989 | Oshita et al. .......................... | 180/79.1 |
| 4,909,343 | 3/1990 | Mouri et al. ............................ | 180/142 |
| 4,951,199 | 8/1990 | Whitehead .......................... | 364/424.05 |
| 4,966,249 | 10/1990 | Imaseki ................................... | 180/233 |
| 5,001,636 | 3/1991 | Shiraishi et al. .................... | 364/424.05 |
| 5,014,802 | 5/1991 | Knoll et al. ............................ | 180/140 |
| 5,094,127 | 3/1992 | Ishida et al. .............................. | 74/866 |
| 5,097,917 | 3/1992 | Serizawa et al. ...................... | 180/79.1 |
| 5,141,069 | 8/1992 | Yasui ..................................... | 180/79.1 |
| 5,225,984 | 7/1993 | Nakayama .......................... | 364/424.05 |
| 5,236,335 | 8/1993 | Takeuchi et al. ..................... | 180/79.1 |
| 5,247,441 | 9/1993 | Serizawa et al. ................... | 364/424.05 |
| 5,289,893 | 3/1994 | Yamamoto et al. .................... | 180/132 |
| 5,347,458 | 9/1994 | Serizawa et al. .................. | 364/424.05 |
| 5,388,658 | 2/1995 | Ando et al. ............................. | 180/197 |
| 5,482,133 | 1/1996 | Iwata et al. ............................. | 180/197 |

FOREIGN PATENT DOCUMENTS 50-33584  10/1975  Japan .

*Primary Examiner*—Kevin J. Teska
*Assistant Examiner*—Tyrone V. Walker
*Attorney, Agent, or Firm*—Weiner, Carrier, Burt & Esser, P.C.; Joseph P. Carrier; Irving M. Weiner

[57] ABSTRACT

In a vehicle steering control system, an actuating torque is applied to steerable wheels according to a steering torque applied to a steering wheel in a conventional manner, and an additional actuating torque is applied to the steering wheel by an electric motor according to lateral dynamic conditions of the vehicle so as to control the lateral stability of the vehicle even in the presence of external interferences such as crosswind. Such external interferences are detected as a lateral dynamic condition of the vehicle such as the yaw rate of the vehicle, and the steering control system produces a steering reaction which counteracts such a lateral dynamic condition by applying the additional actuating torque to the steerable wheels so that the vehicle may maintain a straight course in spite of such external interferences without requiring any intentional efforts by the vehicle operator. In particular, by suppressing the additional actuating torque in an understeer condition, the handling of the vehicle can be improved.

7 Claims, 10 Drawing Sheets

VEHICLE STEERING CONTROL SYSTEM

TECHNICAL FIELD

The present invention relates to a vehicle steering control system, and in particular to a steering control system capable of producing a steering torque that tends to control the undesired behavior of the vehicle when the vehicle is subjected to crosswind or other external interferences.

BACKGROUND OF THE INVENTION

Conventionally, power steering systems are known, and according to the power steering system disclosed in Japanese patent publication No. 50-33584, the steering effort or torque applied to a steering wheel is assisted by an output torque from an electric motor. The gain of the system for the signal obtained by detecting the steering torque applied to the steering wheel by the vehicle operator is varied according to the vehicle speed and the road condition, and the output torque of the assisting electric motor is accordingly changed so that the optimum actuating torque which actually steers the front wheels may be obtained at all times.

When the vehicle is abruptly subjected to a strong crosswind while traveling a straight course, the vehicle may deviate from the intended straight path of travel. In such a case, it is necessary to apply a counteracting force to the steerable wheels so as to oppose interferences. However, according to such a conventional power steering system, for instance, when the vehicle has started deviating from the intended path as a result of crosswind, because the electric motor can produce an actuating torque only when the vehicle operator applies a steering torque to the steering wheel, the electric motor cannot produce any corrective actuating torque unless the vehicle operator intentionally takes a corrective action.

To control the deviation of the vehicle from the intended straight path, the vehicle operator must apply a corrective steering torque to the steering wheel. However, according to the conventional power steering system, the required steering torque increases as the lateral acceleration and the yaw rate of the vehicle increase, and, accordingly, the steering torque required for counteracting the deviation of the vehicle due to external interferences increases as the lateral acceleration and the yaw rate of the vehicle increase.

Furthermore, the conventional power steering system requires a very small steering torque for its operation, but the vehicle operator receives very little feedback from the steering wheel with regard to the behavior of the vehicle. Therefore, the vehicle operator must depend on his vision and bodily sense of acceleration in assessing the condition of the vehicle when it is subjected to external interferences. As a result, the counter-action by the vehicle operator tends to be delayed, and, therefore, tends to be excessive.

To overcome such problems, it is conceivable to detect the irregular behavior of the vehicle due to external interferences from the yaw rate of the vehicle, and produce a force counteracting the irregular behavior of the vehicle by using an assisting motor so that the irregular behavior of the vehicle may be controlled.

However, according to such a control system based on the use of an electric motor, because the system cannot determine whether the detected yaw rate is due to an intentional steering maneuver or due to external interferences, the electric motor always produces a steering torque which tends to control the yaw rate or which tends to restore the vehicle back to the straight ahead path of travel irrespective of the cause of the yawing movement. As a result, the steering reaction which the electric motor produces may become excessive when the vehicle is making a normal turn. If the control parameters are modified so that the steering reaction may be appropriate at the time of normal steering operation, the vehicle may not be sufficiently protected from external interferences.

It was therefore proposed in copending U.S. patent application Ser. No. 08/122,615 filed Sep. 16, 1993, now U.S. Pat. No. 5,528,497, to pre-define a reference yaw rate according to the steering angle, and other optional factors, and determine the actual steering torque that is to be produced by the electric motor of the power steering system according to the deviation of the actual yaw rate from the pre-defined reference yaw rate that is expected from the actual steering input. The contents of such copending patent application are hereby incorporated in the present application by reference.

For satisfactory operation of this system, it is necessary that the reference yaw rate response of the vehicle accurately reflects the actual yaw rate response of the vehicle for each given steering input. However, the actual yaw rate response of the vehicle may change substantially depending on the changes in various factors such as the frictional coefficient of the road surface, the condition and performance of the tires, and the weight distribution of the vehicle. For instance, when the frictional coefficient of the road surface is relatively low, the vehicle tends to demonstrate an understeer property, and the above mentioned system would steer the steerable wheels by a relatively large angle to offset the understeer tendency of the vehicle. However, this does not take into account the cornering force of the front wheels, and the vehicle operator may feel a lateral acceleration that may not be quite expected by the vehicle operator. As this may cause unnecessary strain to the vehicle operator, a vehicle demonstrating such a property may not be acceptable to some sensitive individuals.

BRIEF SUMMARY OF THE INVENTION

In view of such problems of the previously proposed vehicle steering control system, a primary object of the present invention is to provide an improved vehicle steering control system which is capable of controlling the deviation of the vehicle from an intended path of travel and maintaining a straight ahead course without creating any unexpected steering sensations.

A second object of the present invention is to provide an improved vehicle steering control system which is capable of controlling the deviation of the vehicle from an intended path of travel in an optimum fashion regardless of the road conditions and other factors which may affect the handling of the vehicle.

According to the present invention, these and other objects can be accomplished by providing a vehicle steering control system comprising steering torque input means; powered steering control means for applying a first actuating torque to steerable wheels of a vehicle according to a steering torque applied to the steering torque input means; means for detecting a lateral dynamic condition of the vehicle; and active reaction generating means for applying a second actuating torque to the steerable wheels so as to control a turning movement of the vehicle according to a signal supplied from the detecting means. The second actuating torque is determined according to a deviation of an actual lateral dynamic response of the vehicle from a reference lateral dynamic response that is computed for each given steering input also provided is a means for detecting an understeer condition from the deviation, and suppressing the second actuating torque when an understeer condition is detected on a steady basis. The understeer condition is typically detected by measuring a deviation of the actual lateral dynamic response from the reference lateral dynamic response, and determining that the deviation is greater than a certain threshold level.

Thus, when the cornering force of the front wheels is somewhat reduced, and an understeer condition is produced on a steady-state basis, the second actuating torque is canceled, so that the steering assisting torque is prevented from being excessive, and an excessive corrective action by the control system to reduce the deviation of the actual lateral dynamic response of the vehicle from the reference lateral dynamic response can be avoided. The vehicle operator thus would not experience any excessive reduction in the steering effort required for the corrective steering action, and can thereby handle the vehicle in a more comfortable fashion. The lateral dynamic condition may include a yaw rate and a lateral acceleration of the vehicle.

According to a preferred embodiment of the present invention, the detecting means is additionally capable of detecting an oversteer condition, and enables the second actuating torque if an understeer condition is detected but was immediately preceded by an oversteer condition. Such a transition in the steering property of the vehicle may well have been caused by the vehicle operator either intentionally or inadvertently. Therefore, suppressing the second actuating torque under such a condition may be sensed by the vehicle operator as an unexpected discontinuity in the behavior of the vehicle, and should be avoided so as to allow the vehicle operator to handle the vehicle in a stable fashion.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
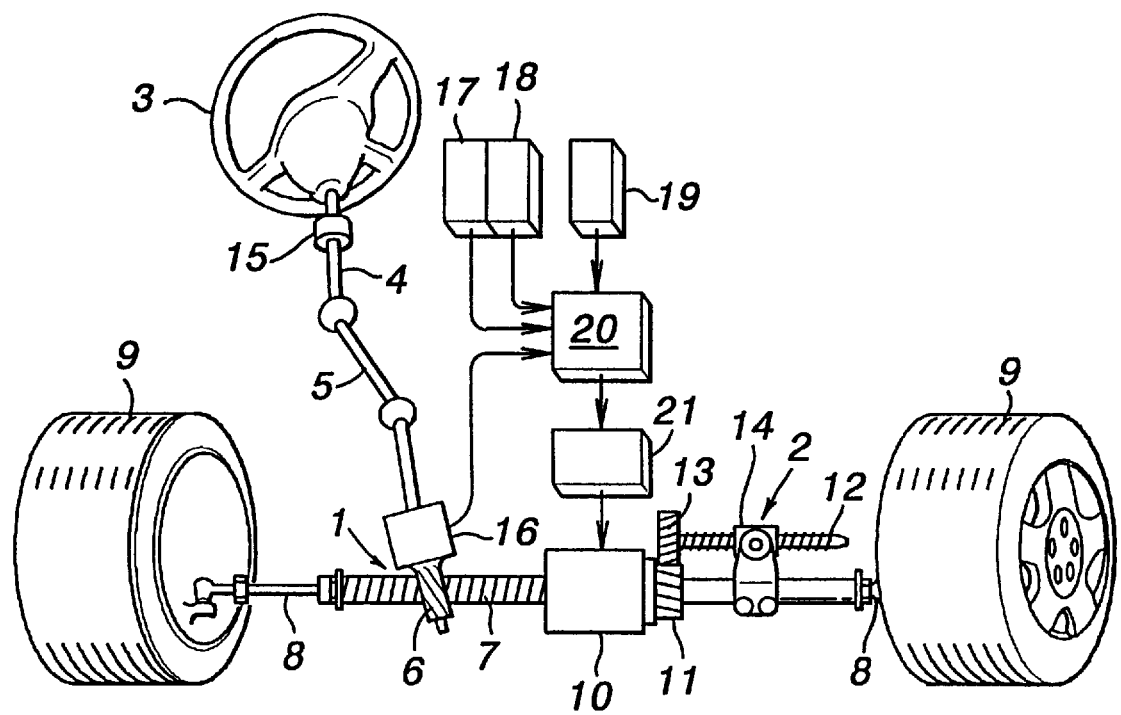
FIG. 1 is a schematic diagram generally illustrating a vehicle steering control system according to the present invention.

FIG. 1 shows the general structure of the vehicle steering system according to the present invention. This device comprises a manual steering force generating unit 1 and an assisting steering force generating unit 2 powered by an electric motor. A steering shaft 4 integrally connected to a steering wheel 3 is connected, at its lower end, to a pinion 6 of a rack and pinion mechanism via a universal joint 5. The rack and pinion mechanism further comprises a rack 7 which can move laterally of the vehicle body and meshes with the pinion 6. The two ends of the rack 7 are connected to the knuckle arms of the right and left front wheels 9 via tie rods 8, respectively. Such structure is conventional, and the normal steering action based on the use of the rack and pinion mechanism can be accomplished.

The rack 7 is coaxially passed through an electric motor 10. More specifically, the rack 7 is passed through a hollow rotor having a helical drive gear 11 which meshes with a helical driven gear 13 mounted to an axial end of a screw shaft 12 of a ball screw mechanism extending in parallel with the rack 7. A nut 14 of the ball screw mechanism is fixedly secured to the rack 7.

The steering shaft 4 is provided with a steering angle sensor 15 for producing a signal corresponding to the rotational angle of the steering wheel 3 and a torque sensor 16 for producing a signal corresponding to a steering torque applied to the steering shaft 4.

The vehicle body carries a lateral acceleration sensor 17 for producing a signal corresponding to the lateral acceleration applied to the vehicle body, a yaw rate sensor 18 for producing a signal corresponding to the yaw rate (angular speed of the yawing movement) of the vehicle body, and a vehicle speed sensor 19 for producing a signal corresponding to the traveling speed of the vehicle.

In this embodiment, the steering wheel 3 and the steerable wheels or the front wheels 9 are mechanically connected to each other, and a control signal obtained by processing the outputs from the various sensors 15 through 19 is supplied to the electric motor 10 via a control unit 20 and a drive circuit 21 so that the output torque of the electric motor 10 may be controlled as required.

Figure 2:
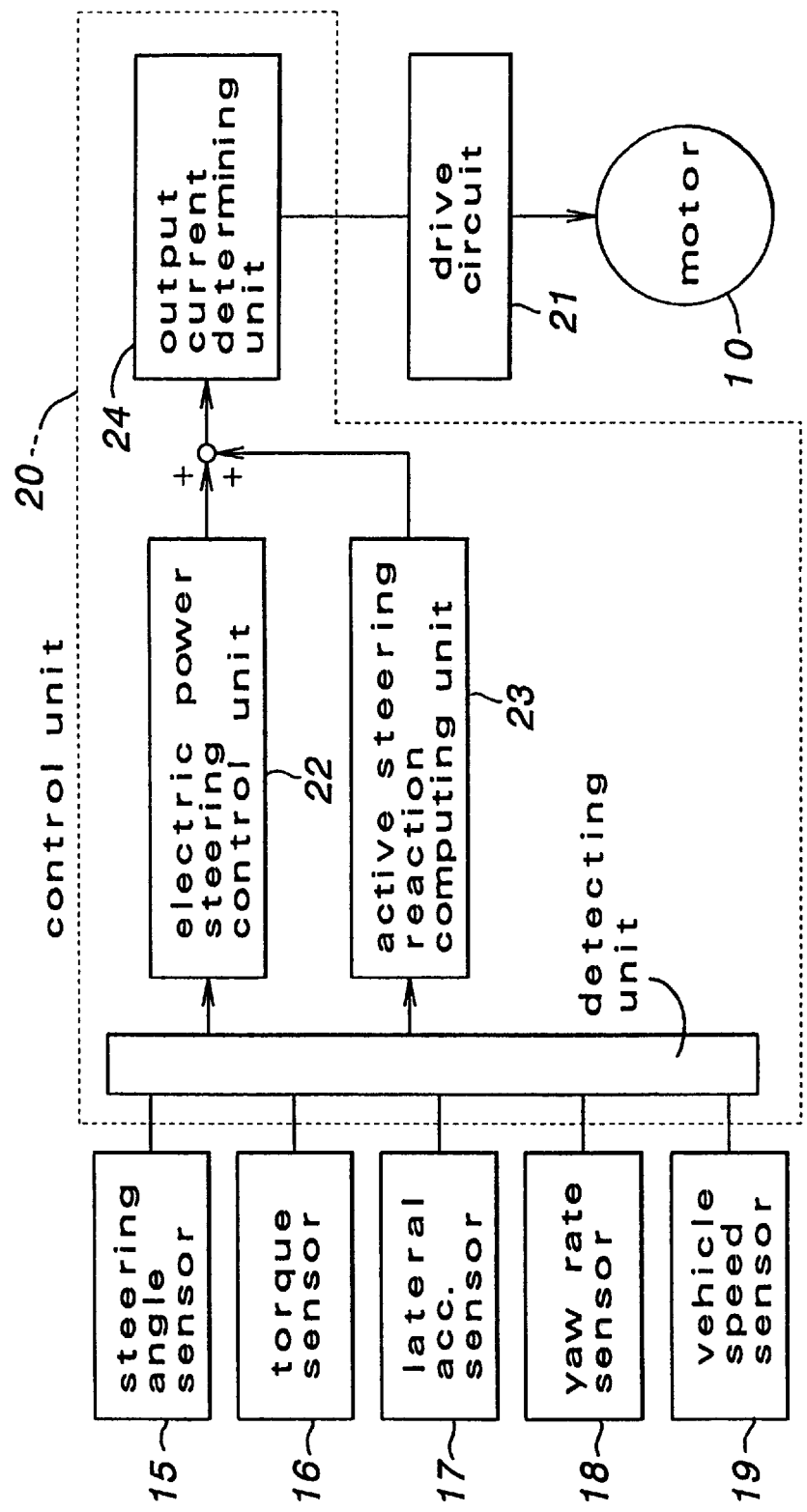
FIG. 2 is a block diagram showing the general structure of the vehicle steering control system.

FIG. 2 shows a schematic block diagram of a control system to which the present invention is applied. The control unit 20 receives the outputs from the steering angle sensor 15, the steering torque sensor 16, the lateral acceleration sensor 17, the yaw rate sensor 18, and the vehicle speed sensor 19. These output signals are fed to an electric power steering control unit 22 and an active steering reaction computing unit 23, and the outputs from these units are supplied to an output current determining unit 24 so that the target electric current level for the electric motor 10 may be determined.

The electric power steering control unit 22 carries out the control for the normal power assist for the steering force or the actuating torque for the steerable front wheels 9. This control unit 22 may be capable of determining the target actuating torque according to the lateral acceleration and the yaw rate.

The active steering reaction computing unit 23 computes the target actuating torque according to an algorithm which is described hereinafter. The output current determining unit 24 determines the target driving current signal which is proportional or otherwise corresponds to the deviation of the actual steering torque obtained from the torque sensor 16 from the target steering torque value. The target driving current signal is, however, opposite in sign to the deviation.

The target drive current value thus obtained is supplied to the drive circuit 21. This drive circuit 21 controls the electric motor 10, for instance by PWM control, and an actually detected current value obtained from a current detection sensor is fed back to the input signal to the drive circuit 21 or the target drive current value.

Figure 3:
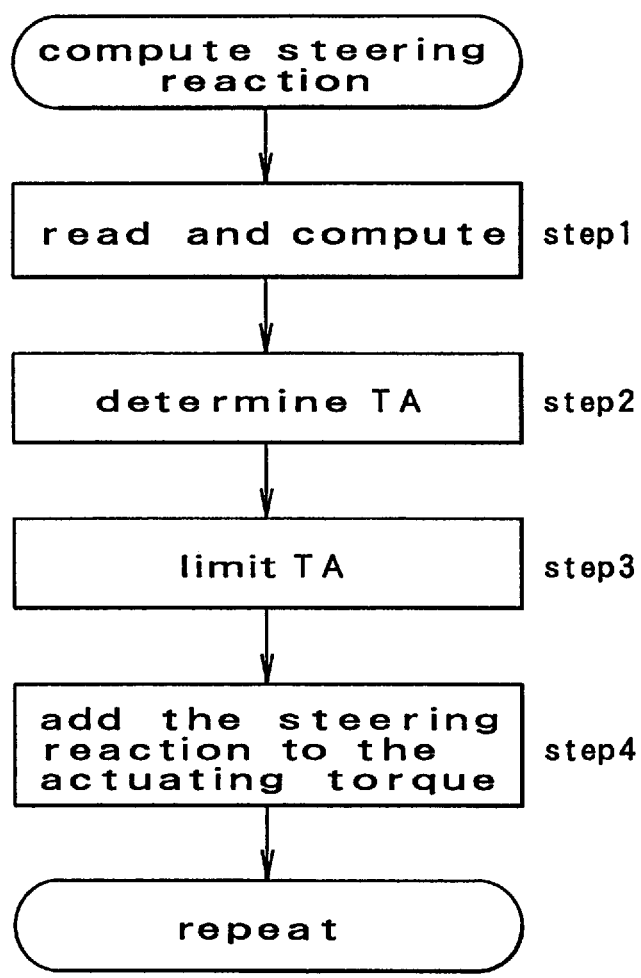
FIG. 3 is a flow chart showing the main control flow of the vehicle steering control system.

In the active steering reaction computing unit 23 in the control unit 20, the process shown by the flow chart of FIG. 3 is cyclically executed at a prescribed period. First of all, in step 1, the output signals from the various sensors are read out, and the steering angular speed and the yaw acceleration are computed. In step 2, the steering reaction TA is determined. A limit is set on the target steering reaction in step 3, and this control signal is added to the output of the electric power steering control unit 22 in step 4.

Figure 4:
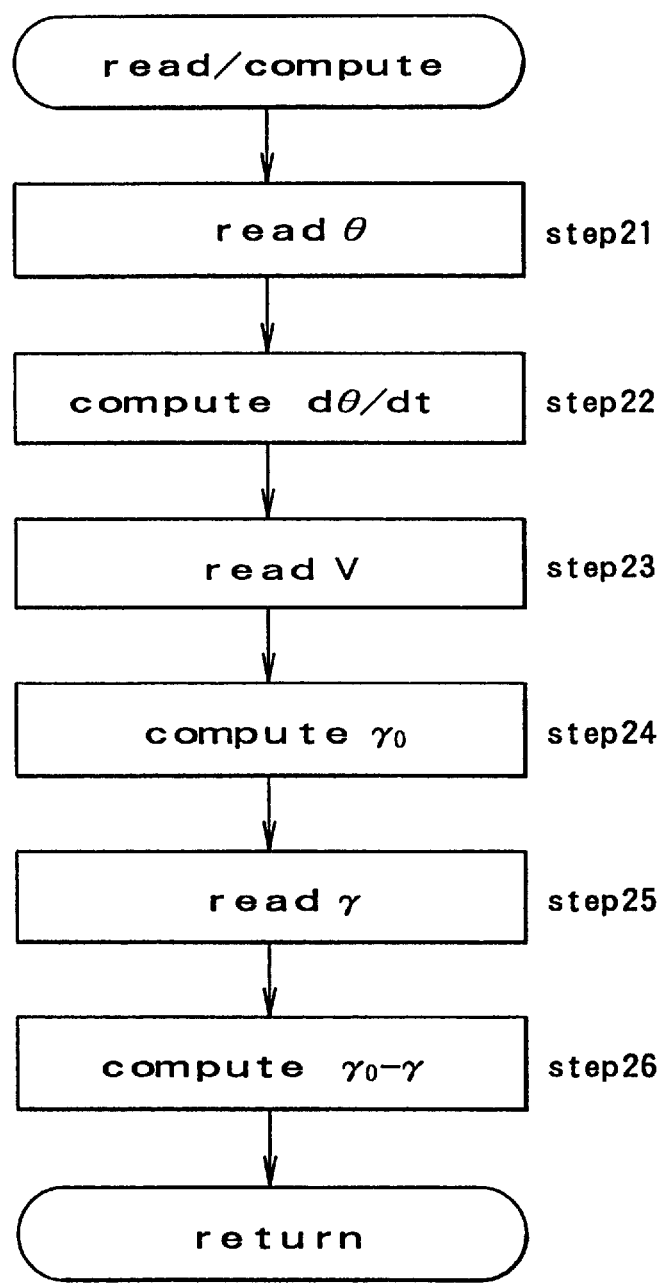
FIG. 4 is a flow chart showing step 1 of FIG. 3 in more detail.

This control process will now be described in more detail with reference to FIGS. 4 through 7. With reference to FIG. 4, step 1 includes the following sub-steps. First of all, the steering angle $\theta$ is read (step 21), and the steering angular velocity $d\theta/dt$ is computed by differentiating the steering angle $\theta$ (step 22). Then, the vehicle speed V is read (step 23), and the reference yaw rate response $\gamma_0$ is computed according to a predetermined transfer function of the vehicle (step 24). The current actual yaw rate $\gamma$ is read (step 25), and the deviation of the actual yaw rate from the reference yaw rate $\gamma-\gamma_0$ is computed (step 26).

Figure 5:
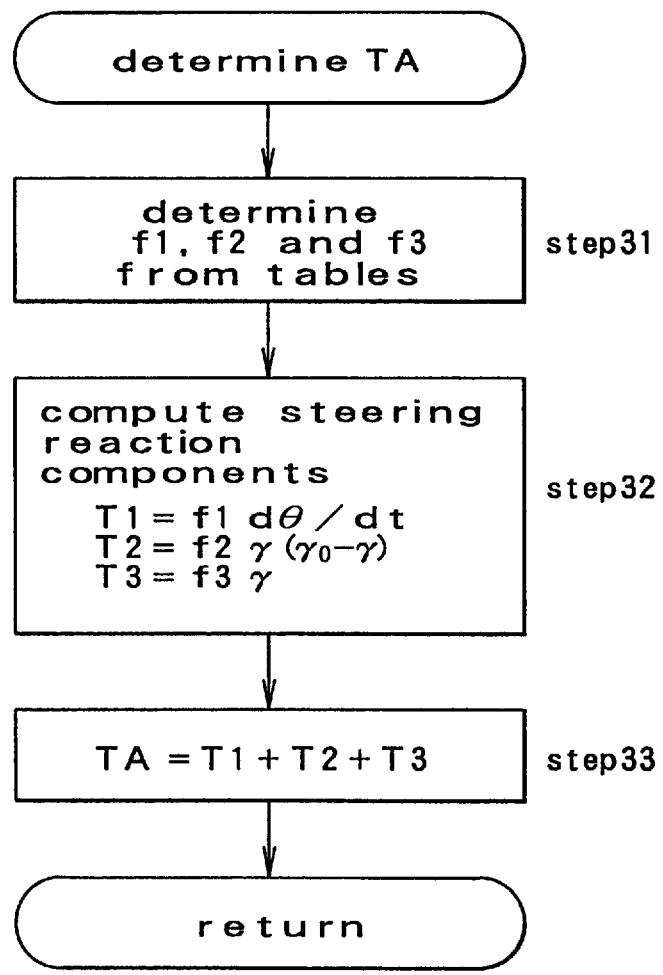
FIG. 5 is a flow chart showing step 2 of FIG. 3 in more detail.
Figure 8:
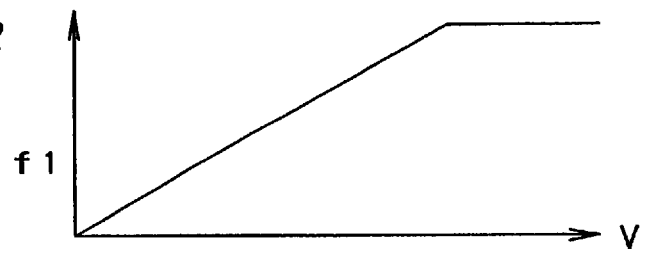
FIG. 8 shows graphs representing the dependence of the weighting functions f1 through f3 on the vehicle speed V.
Figure 8:
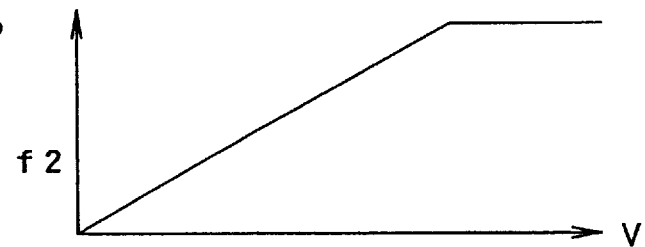
Figure 8:
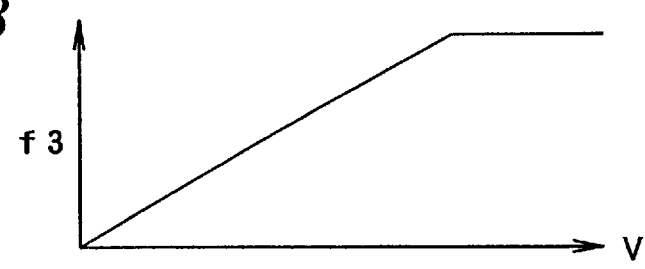

With reference to FIG. 5, step 2 includes the following sub steps. Coefficients f1, f2 and f3 are weighting functions for the steering speed $d\theta/dt$, the yaw rate deviation $\gamma-\gamma_0$ and the actual yaw rate $\gamma$, and are obtained from data tables using the vehicle speed as the address as illustrated in FIG. 8 (step 31). The steering reaction components T1, T2 and T3 are computed from these variables and the corresponding coefficients (step 32), and the target steering reaction TA is computed by adding up these components (step 33). A constraint is imposed such that T2>T3. Each of the coefficients consists of a generally linear function which progressively increases with speed, but saturates at a certain vehicle speed. Thus, the weight of each of these coefficients is increased so as to better control the influences of external interferences which tend to increase with speed.

Figure 6:
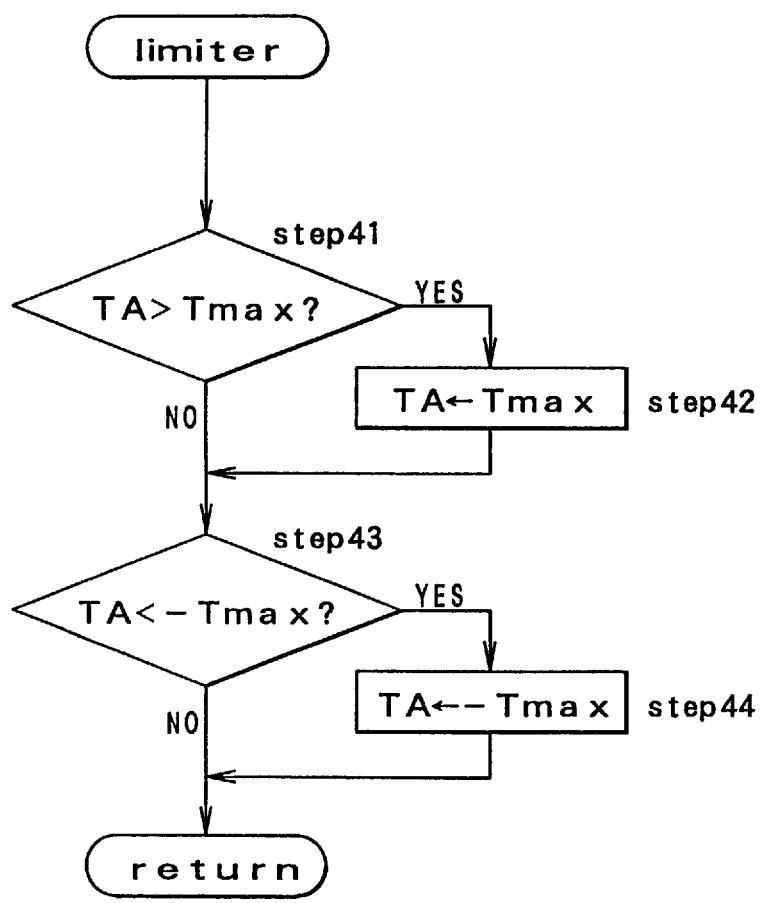
FIG. 6 is a flow chart showing step 3 of FIG. 3 in more detail.
Figure 7:
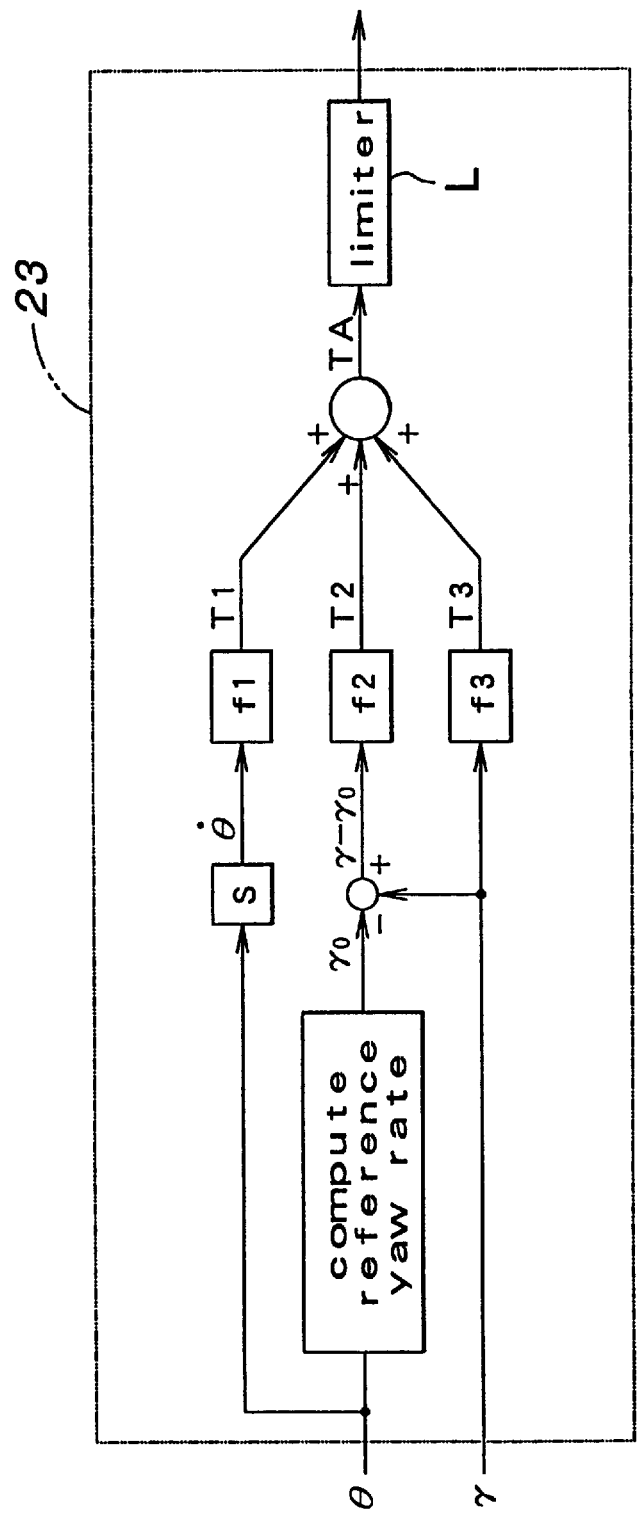
FIG. 7 is a block diagram showing the active steering reaction computing unit 23 of FIG. 2 in more detail.

Step 3 is carried out as shown in FIG. 6. This process corresponds to the action of the limiter L in FIG. 7. First of all, it is determined whether the target steering reaction TA has exceeded a prescribed level Tmax (step 41), and if that is the case, the target steering reaction TA is set at the prescribed maximum level Tmax (step 42). If the target steering reaction TA is lower than this prescribed level Tmax, it is likewise determined whether the target steering reaction TA has fallen below another prescribed level -Tmax (step 43). If the target steering reaction TA is lower than this prescribed level -Tmax, the target steering reaction TA is set at the prescribed minimum level -Tmax (step 44).

The target steering reaction TA thus determined is added to the target assisting actuating torque, and the sum is converted into a target electric current level by the output current determining unit 24 to be supplied to the drive circuit 21.

Thus, when the vehicle 25 deviates from the intended straight path 26 due to crosswind, the deviation $\gamma-\gamma_0$ between the current yaw rate $\gamma$ and the reference yaw rate $\gamma_0$ is detected, and the electric motor 10 is activated in such a manner that the deviation may be eliminated even in the absence of any intentional efforts to turn the steering wheel 3 by the vehicle operator, or that the deviation of the vehicle 25 from the straight path 26 may be eliminated and the vehicle 25 may be brought back on the straight path 26.

Thus, even when the vehicle 25 is subjected to a yaw rate $\gamma$ due to crosswind or other interferences, and the vehicle operator is not applying any steering effort to the steering wheel, the front wheels 9 are automatically steered so as to restore the vehicle 25 to the straight path without involving any irregular behavior of the vehicle. Even when the vehicle operator is holding on to the steering wheel 3, the same result can be achieved if he simply follows the movement of the steering wheel 3.

When the vehicle is making a turn without involving any substantial external interferences, some yaw rate is produced, but the deviation $\gamma-\gamma_0$ between the current yaw rate $\gamma$ and the reference yaw rate $\gamma_0$ is so small and the contribution of the deviation to the steering reaction is therefore so small that the vehicle operator can complete the turning maneuver without encountering any excessive steering reaction.

When the vehicle is traveling over a road surface having a relatively low frictional coefficient, the vehicle tends to demonstrate an understeer property. Therefore, the actual yaw rate $\gamma$ falls below the reference yaw rate $\gamma_0$. In such a situation, the vehicle steering control system actuates the electric motor in such a manner to increase the steering angle, but this steering operation does not account for the limit of the cornering force of the front wheels and the vehicle operator may not feel comfortable with what appears to be an excessive corrective steering action. In such a situation, it is preferable to tolerate the understeer tendency for the stability of the vehicle.

According to the present invention, if the system determines that the vehicle is demonstrating either an understeer tendency ($\gamma<\gamma_0$) or an oversteer ($\gamma>\gamma_0$) tendency by comparing the actual yaw rate response $\gamma$ with the reference yaw rate $\gamma_0$, and that this tendency has persisted more or less on a steady basis, the steering reaction component T2 attributed to the deviation $\gamma-\gamma_0$ between the current yaw rate $\gamma$ and the reference yaw rate $\gamma_0$ is suppressed to zero. If the transition from an overseer tendency to an understeer tendency is caused by an improper steering maneuver involving extreme acceleration and/or deceleration by the vehicle operator, suppressing the contribution of the above-mentioned steering reaction component T2 would cause an undesirable discontinuous impression to the vehicle operator, and would not be beneficial for the handling of the vehicle. Thus, in such a situation, the steering reaction component T2 is maintained. This control process is illustrated in FIG. 9.

Figure 9:
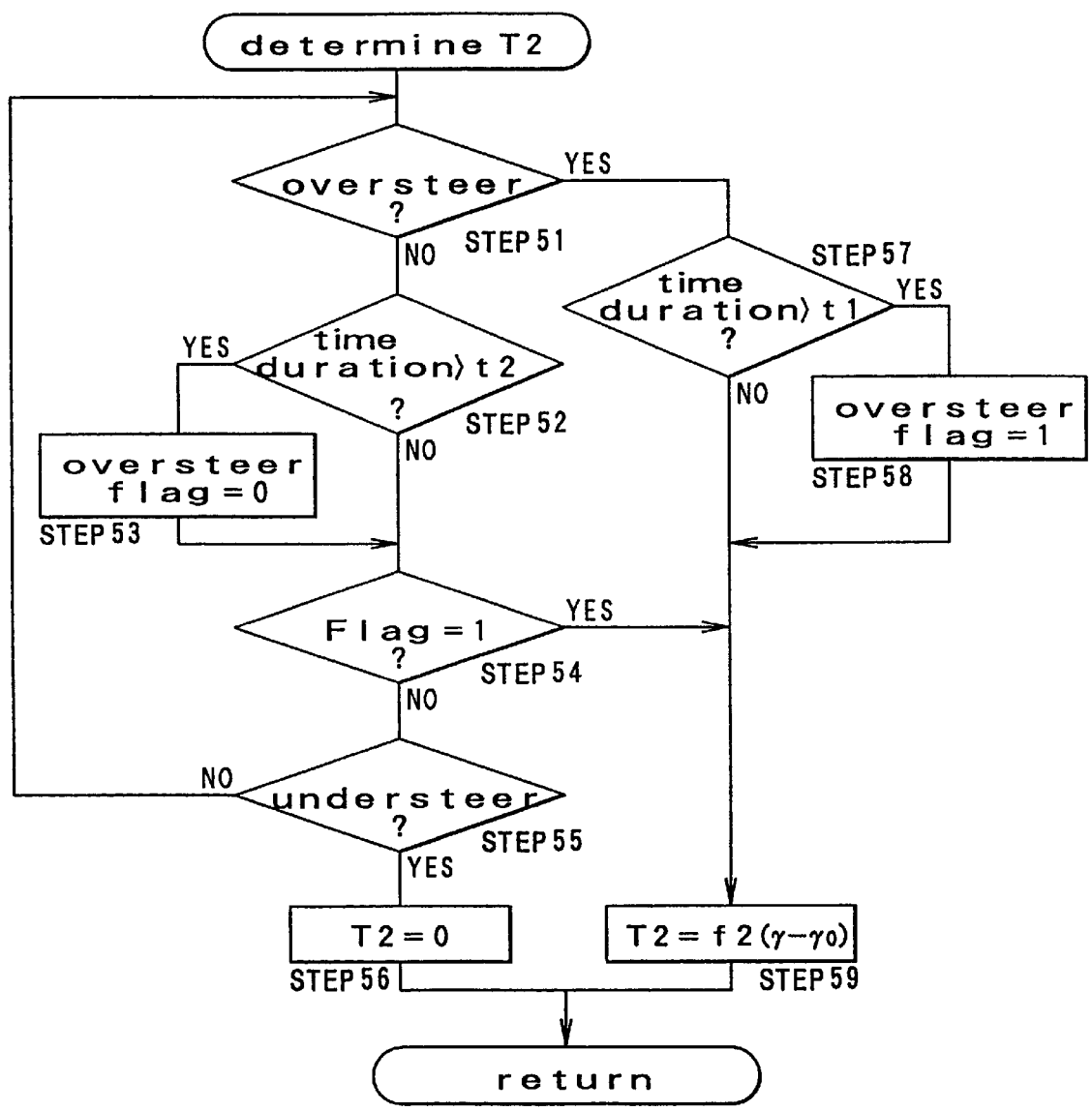
FIG. 9 is a flow chart showing the operation of the vehicle steering control system when understeer and oversteer tendencies are detected.
Figure 10:
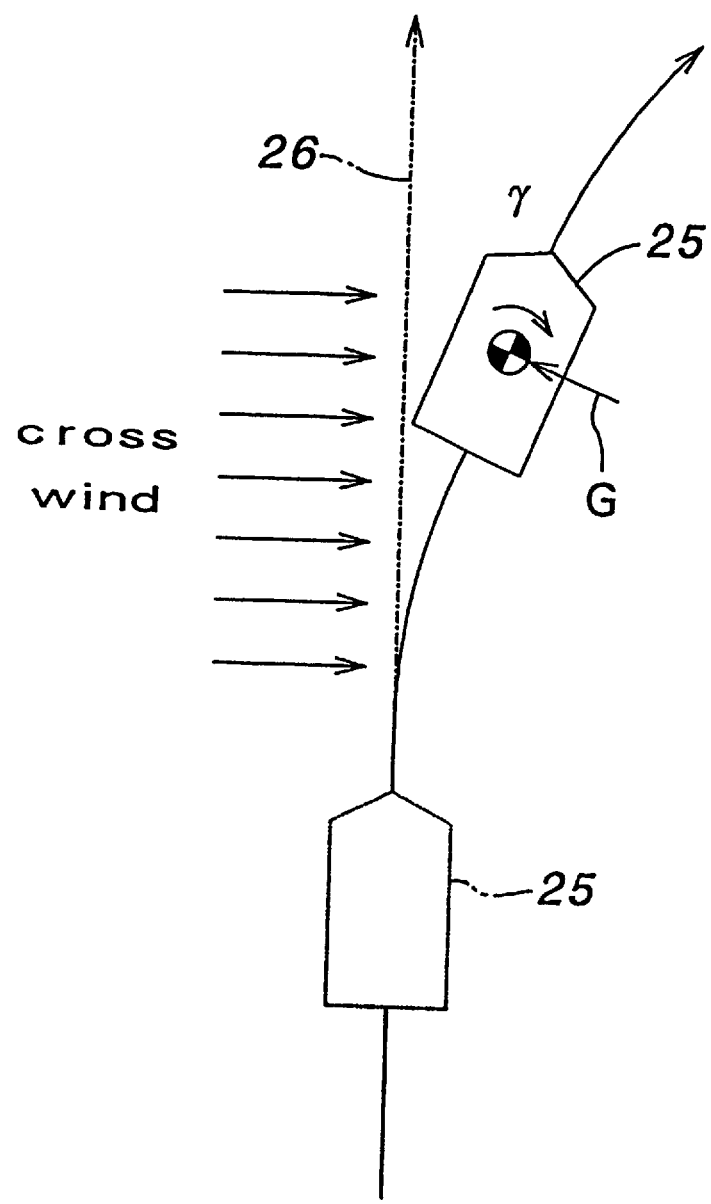
FIG. 10 illustrates the movement of the vehicle when it is traveling a straight course and abruptly subjected to crosswind.

Referring to FIG. 9, by comparing the current yaw rate $\gamma$ with the reference yaw rate $\gamma_0$, it is determined if any oversteer tendency is present (step 51). If no oversteer tendency is detected, it is determined if this non-oversteer condition has persisted for more than a prescribed time period $t_2$ (step 52). If it has persisted for more than the prescribed time period $t_2$, the flag for indicating an oversteer condition is set to zero (step 53). If the non-oversteer condition has not yet persisted for the prescribed time period $t_2$, the flag is checked in the next step (step 54). If the flag is not 1 or no oversteer condition has been previously detected, it is determined if any understeer condition is present (step 55). If no understeer condition is currently present, the program flow returns to step 51. Otherwise the reaction component T2 is set to zero (step 56). If a cessation of an oversteer condition is detected in step 51, and it is detected that the oversteer flag is 1 in step 54, the reaction component T2 is enabled such that T2=f2($\gamma-\gamma_0$). In other words, the reaction component T2 is disabled when an understeer condition has been present without any intervention of an oversteer condition for some time, and is enabled (T2=f2($\gamma-\gamma_0$)) if the current understeer or neutral steer condition has been immediately preceded by an oversteer condition.

If an oversteer condition is detected in step 51, it is determined if a time period $t_1$ has elapsed since the onset of the oversteer condition (step 56). If the time period $t_1$ has elapsed, the oversteer condition flag is set to 1 (step 57), and the reaction component $T2=f2(\gamma-\gamma_0)$ is enabled (step 58). Also if the time period $t_1$ has not yet elapsed, the reaction component $T2=f2(\gamma-\gamma_0)$ is enabled (step 58). In other words, if an oversteer condition is present, the reaction component $T2=f2(\gamma-\gamma_0)$ is unconditionally applied to the steering torque.

The detection of the oversteer and understeer conditions can also be done by setting an understeer threshold and an oversteer threshold for the yaw rate deviation, and comparing the yaw rate deviation with these threshold values.

Thus, when an understeer property is produced due to crosswind acting upon the vehicle body during a turning maneuver or due to a change in the frictional coefficient of the road surface, the compensatory steering reaction by the vehicle steering control system is suppressed whereby the vehicle is not subjected to any excessive corrective response of the steering control system, and the vehicle operator is not subjected to any unanticipated response of the vehicle. When an oversteer condition of the vehicle is changed over to an understeer condition by an improper steering maneuver involving extreme acceleration and/or deceleration by the vehicle operator, the irregular behavior of the vehicle is controlled by the application of a controlled steering reaction by the steering control system. In this manner, the present invention achieves a favorable control of the dynamic lateral response of the vehicle even in case of external disturbances such as crosswind and changes in the condition of the road surface without causing any unfamiliar sensation to the vehicle operator.

Although the present invention has been described in terms of a specific embodiment thereof, it is possible to modify and alter details thereof without departing from the spirit of the present invention.

What we claim is:

1. A vehicle steering control system, comprising
   steering torque input means;
   powered steering control means for applying a first actuating torque to steerable wheels of a vehicle according to a steering torque applied to said steering torque input means;
   means for detecting a lateral dynamic condition of said vehicle;
   active reaction generating means for applying a second actuating torque to said steerable wheels so as to control a turning movement of said vehicle according to a signal supplied from said detecting means, said second actuating torque being determined according to a deviation of an actual lateral dynamic response of said vehicle from a reference lateral dynamic response that is computed for each given steering input; and
   means for detecting an understeer condition from said deviation, and suppressing said second actuating torque when an understeer condition is detected on a steady basis.

2. A vehicle steering control system according to claim 1, wherein said detecting means is additionally capable of detecting an oversteer condition, and enables said second actuating torque if an understeer condition is detected but was immediately preceded by an oversteer condition.

3. A vehicle steering control system according to claim 1, wherein said detecting means detects an understeer condition by measuring a deviation of said actual lateral dynamic response with said reference lateral dynamic response, and determining that said deviation is greater than a certain threshold level.

4. A vehicle steering control system according to claim 1, wherein said lateral dynamic condition includes a yaw rate of said vehicle.

5. A vehicle steering control system according to claim 1, wherein said lateral dynamic condition includes a lateral acceleration of said vehicle.

6. A vehicle steering control system according to claim 1, wherein said powered steering control means applies said first actuating torque to said steerable wheels even when said second actuating torque is suppressed.

7. A vehicle steering control system according to claim 1, wherein said detecting means suppresses only said second actuating torque when said understeer condition is detected on a steady basis.

* * * * *

UNITED STATES PATENT AND TRADEMARK OFFICE
CERTIFICATE OF CORRECTION

PATENT NO. : 5,774,819
DATED : June 30, 1998
INVENTOR(S) : Yorihisa Yamamoto, Yutaka Nishi, Takashi Nishimori,
Hiroyuki Tokunaga, Hideki Machino It is certified that error appears in the above-identified patent and that said Letters Patent is hereby corrected as shown below:

Column 3, line 1, change "input also" to --input.  Also--.

Column 5, 25th line, change "sub steps" to --sub-steps--.

Signed and Sealed this

Sixteenth Day of March, 1999

Attest:

Attesting Officer

Q. TODD DICKINSON

Acting Commissioner of Patents and Trademarks